(12) United States Patent
Reuter et al.

(10) Patent No.: US 10,641,410 B2
(45) Date of Patent: May 5, 2020

(54) PNEUMATIC VALVE FOR AIR SUSPENSION SYSTEMS

(71) Applicant: BeijingWest Industries Co., Ltd., Beijing (CN)

(72) Inventors: David Fredrick Reuter, Beavercreek, OH (US); Yinko Grajeda, Bellbrook, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/859,032

(22) Filed: Dec. 29, 2017

(65) Prior Publication Data

US 2018/0223943 A1 Aug. 9, 2018

Related U.S. Application Data

(60) Provisional application No. 62/456,784, filed on Feb. 9, 2017.

(51) Int. Cl.
*F16K 31/06* (2006.01)

(52) U.S. Cl.
CPC ...... *F16K 31/0689* (2013.01); *F16K 31/0655* (2013.01); *F16K 31/0658* (2013.01); *F16K 31/0696* (2013.01)

(58) Field of Classification Search
CPC . F16F 9/54; F16F 9/3207; F16F 9/084; B60G 15/12; B60G 2202/314;

(Continued)

(56) References Cited

U.S. PATENT DOCUMENTS

| 2,700,392 A | 1/1955 | Harstick |
| 2,731,905 A | 1/1956 | Piet |

(Continued)

FOREIGN PATENT DOCUMENTS

| CN | 101016950 | 8/2007 |
| CN | 101038042 | 9/2007 |

(Continued)

OTHER PUBLICATIONS

Extended European Search Report dated Jun. 28, 2018 for counterpart European Patent Application No. EP18000098.6.

(Continued)

*Primary Examiner* — Eric Keasel
(74) *Attorney, Agent, or Firm* — William H. Honaker; Dickinson Wright PLLC (57) ABSTRACT

Disclosed is a pneumatic solenoid poppet valve assembly having a dampening element. The valve assembly comprises a housing with a stator having a spring pocket being secured to the housing and an armature slidably located inside the housing. The armature has a spring pocket and an armature return spring located in the spring pockets of the stator and the armature, the spring biases the armature away from the stator thereby creating an air gap between them. A dampening element is located in the spring pocket of the stator surrounding the return spring and extending into the air gap. When the solenoid is energized the armature is moved across the air gap and contacts the dampening element prior to contacting the stator and the dampening element dampens movement of the stator across the air gap. A molded seat retainer locates upper and lower seals, provides a valve seat and flow passages.

12 Claims, 9 Drawing Sheets

(58) Field of Classification Search
CPC ............. F16K 31/0689; F16K 31/0655; F16K 31/0658; F16K 31/0696
See application file for complete search history.

(56) References Cited

U.S. PATENT DOCUMENTS

| | | | |
|---|---|---|---|
| 3,159,774 | A | 12/1964 | Dube et al. |
| 3,245,655 | A | 4/1966 | Oetjens |
| 3,246,073 | A | 4/1966 | Bouche et al. |
| 4,082,116 | A * | 4/1978 | Stampfli ............. F16K 31/0655 137/630.14 |
| 4,509,473 | A | 4/1985 | Hamparian |
| 4,763,562 | A | 8/1988 | Haytayan |
| 5,120,277 | A | 6/1992 | Georget et al. |
| 5,924,676 | A | 7/1999 | Cook et al. |
| 6,105,884 | A | 8/2000 | Molnar et al. |
| 6,267,350 | B1 | 7/2001 | Slawinski et al. |
| 6,488,050 | B1 | 12/2002 | Jabcon |
| 6,668,861 | B2 | 12/2003 | Williams |
| 7,140,595 | B2 | 11/2006 | Youngberg et al. |
| 7,331,331 | B2 | 2/2008 | Hanawa et al. |
| 7,537,024 | B2 | 5/2009 | Adams et al. |
| 8,052,129 | B2 | 11/2011 | Youd et al. |
| 8,544,816 | B2 | 10/2013 | Bielass |
| 8,770,221 | B2 | 7/2014 | Ishitoya et al. |
| 2006/0011184 | A1 | 1/2006 | Jacobsson et al. |
| 2006/0037648 | A1 | 2/2006 | Krishnamoorty et al. |
| 2007/0069166 | A1* | 3/2007 | Sisk ................... F16K 31/0655 251/64 |
| 2007/0181840 | A1 | 8/2007 | Mitsumata et al. |
| 2010/0019180 | A1 | 1/2010 | Voss |
| 2011/0308632 | A1 | 12/2011 | Ericson et al. |
| 2013/0020514 | A1 | 1/2013 | Watanabe et al. |
| 2014/0217318 | A1* | 8/2014 | Schlick ................ F16J 15/3232 251/129.15 |
| 2016/0061334 | A1 | 3/2016 | Gillespie et al. |
| 2016/0327173 | A1 | 11/2016 | Pemer et al. |
| 2018/0038317 | A1* | 2/2018 | Nagata ............... F02M 21/0254 |
| 2018/0163685 | A1* | 6/2018 | Yasukawa .............. F02M 51/06 |
| 2019/0049037 | A1* | 2/2019 | Lee ..................... F16K 31/0689 |

FOREIGN PATENT DOCUMENTS

| | | |
|---|---|---|
| CN | 200971968 | 11/2007 |
| CN | 202852135 | 4/2013 |
| CN | 202937867 | 5/2013 |
| CN | 205859198 | 1/2017 |
| EM | 2551872 A1 | 1/2013 |
| JP | 60024984 | 2/1985 |
| JP | H0320775 | 2/1991 |
| JP | H10089527 | 4/1998 |
| JP | 2006189140 | 7/2006 |
| JP | 2010520979 | 6/2010 |
| JP | 2010223364 | 10/2010 |
| JP | 2011256951 | 12/2011 |
| JP | 2014105754 | 6/2014 |
| WO | 20141594154 A1 | 10/2014 |

OTHER PUBLICATIONS

First Office Action and search report dated Dec. 29, 2018 for counterpart Chinese patent application No. 201810029003.6.
First Office Action issued for corresponding Japanese Patent Application 2018-020666 dated Feb. 5, 2019 and translation.

* cited by examiner

PNEUMATIC VALVE FOR AIR SUSPENSION SYSTEMS

RELATED APPLICATIONS

This application claims the benefit of U.S. Provisional Application No. 62/456,784, filed on Feb. 9, 2017.

STATEMENT REGARDING FEDERALLY SPONSORED RESEARCH

NONE.

TECHNICAL FIELD

This invention relates generally to pneumatic solenoid poppet valves for air suspension systems and more particularly to a pneumatic solenoid poppet valve having improved noise suppression and valve seat characteristics.

BACKGROUND OF THE INVENTION

Air suspension or air lift systems for vehicles are used in place of or to supplement traditional steel suspension systems in many vehicles. In these air-based systems solenoid operated poppet valves are used to control the pressures in the air springs. The air suspension systems in vehicles may be employed in the rear axle system only, in the both the front and rear axles independently, or independently on all four wheels of the vehicle. The solenoid poppet valves must be designed to meet system flow, pressure, temperature and voltage specifications. These criteria place many demands on the poppet valves. The valves are typically designed to be closed when the solenoid is not engaged or activated. The valves are designed to exhibit close to zero leak rates both when pressure is attempting to open the valve and when pressure is closing the valve. To accomplish these tasks the solenoid poppet valves include elastomeric sealing members and large armature return springs. One issue with existing solenoid poppet valves is that a loud "clicking" noise occurs as the armature is activated when it strikes a stator in the poppet valve. In addition, current valve seat designs, which seat the solenoid poppet valve in its modulator bore, are not optimum for low cost and flexibility of use.

It is desirable to provide a solenoid poppet valve for an air suspension system that has reduced noise in use and that has a more efficient valve seat design.

SUMMARY OF THE INVENTION

In general terms, this invention provides a pneumatic solenoid poppet valve having a dampening element and a valve seat that permits air to flow through it. In a first embodiment, the pneumatic solenoid poppet valve assembly comprises a housing having a first end and a second end; a stator secured in and to the first end of the housing and including a spring pocket; the second end of the housing retained in a valve seat; an armature located fully inside the housing and between the stator and the second end and slidable in the housing, the armature including a spring pocket; an armature return spring located in the spring pocket of the stator and in the spring pocket of the armature, the return spring biasing the armature away from the stator and creating an air gap between the stator and the armature; and a dampening element located in the spring pocket in the stator, the dampening element surrounds the return spring in the spring pocket in the stator and extends out of the spring pocket in the stator into the air gap, wherein when a solenoid is energized the armature is moved across the air gap and contacts the dampening element prior to contacting the stator and the dampening element dampens movement of the stator across the air gap.

In a second embodiment the present invention is a pneumatic solenoid poppet valve assembly comprising: a housing having a first end and a second end; a stator secured in and to the first end of the housing and including a spring pocket; the second end of the housing retained in a valve seat; an armature located fully inside the housing and between the stator and the second end and slidable in the housing, the armature including a spring pocket; an armature return spring located in the spring pocket of the stator and in the spring pocket of the armature, the return spring biasing the armature away from the stator and creating an air gap between the stator and the armature; and the valve seat comprising an upper portion and a lower portion, the upper portion including a plurality of ribs with each rib separated from an adjacent rib by a gap, the gaps permitting air flow through the upper portion.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
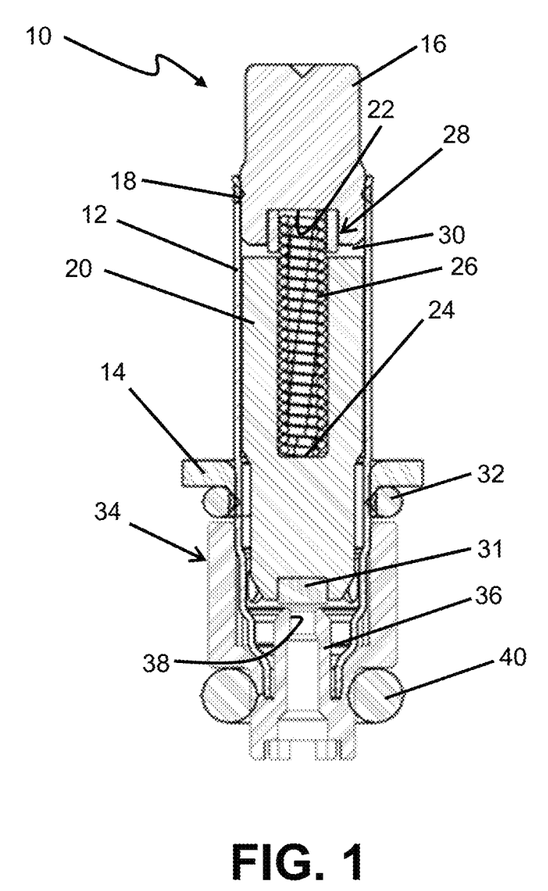
FIG. 1 is a cross-sectional view of a solenoid poppet valve assembly designed in accordance with the present invention.

The present invention is directed toward a solenoid poppet valve assembly having a number of novel features. FIG. 1 is a cross-sectional view of a solenoid poppet valve assembly 10 according to the present invention. The valve assembly 10 includes a deep drawn housing 12 and a flange 14, preferably the flange 14 is secured to the housing 12 by a laser weld, not shown, which is airtight. A stator 16 is located in a first end of the housing 12 and extends outside the housing 12 as shown. The stator 16 is preferably secured in position in the housing 12 by an airtight laser weld 18. The valve assembly 10 further includes an armature 20 that is slidable within the housing 12. Both the stator 16 and the armature 20 each include a spring pocket 22, 24 respectively, which accommodates an armature 20 return spring 26. The spring 26 bias the armature 20 away from the stator 16 and creates an air gap 30 between them. The solenoid coil will not be shown in the Figures; however it is well known to those of skill in the art. A dampening element 28 is located in the spring pocket 22 of the stator 16 and surrounds the return spring 26. The air gap 30 is defined between the stator 16 and the armature 20 when the solenoid coil is not energized as shown in FIG. 1. When the surrounding solenoid coil, not shown, is energized the armature 20 is pulled across the air gap 30 and against the stator 16 following the magnetic inverse square law. In a typical solenoid poppet valve not according to the present invention, i.e. one not having a dampening element 28, the energized solenoid coil pulls the armature 20 against the stator 16 and when the armature 20 strikes the stator 16 it creates a loud "clicking" noise that is undesirable. A sealing disc 31 is located at one end of the armature 20. The valve assembly 10 further comprises an upper seal 32 located between the flange 14 and a valve seat 34, the upper seal 32 in cooperation with the flange 14 seals the housing 12 to the valve seat 34.

A second end of the housing 12 is received in the valve seat 34. The valve seat 34 includes a valve seat retainer 36 and a control orifice 38, which extends through the valve seat 34. The sealing disc 31 is biased against the control orifice 38, thereby sealing it, by the spring 26 when the solenoid coil is not energized as shown in FIG. 1. The valve assembly 10 further comprises a lower seal 40, in this figure it is shown as an O-ring. When the solenoid core, not shown, of the valve assembly 10 is energized it causes the armature 20 to move across the air gap 30 and against the stator 16.

Figure 2:
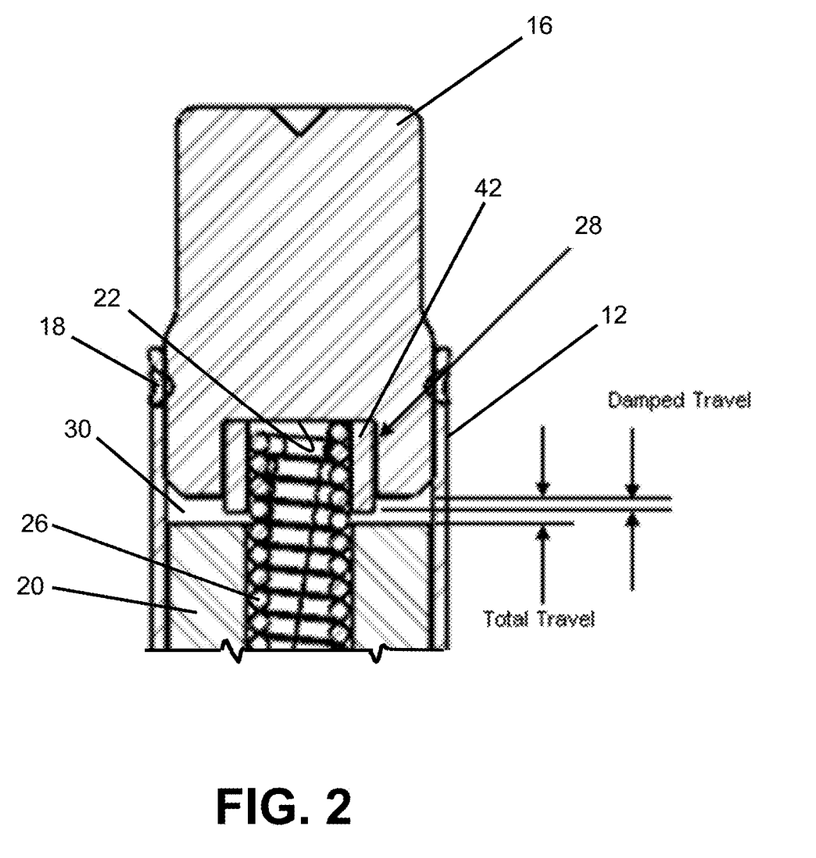
FIG. 2 is a cross-sectional view of a portion of the solenoid poppet valve assembly of FIG. 1 showing a dampening element according to one embodiment of the present invention.

FIG. 2 is a cross-sectional view of a portion of the valve assembly 10 of FIG. 1 showing a dampening element 28 according to one embodiment of the present invention. In this embodiment, the dampening element 28 is an elastomeric, hollow, cylinder 42 located in the pocket 22. The cylinder 42 surrounds the spring 26 in the pocket 22 and extends out beyond the pocket 22 in the stator 16 into the air gap 30. The cylinder 42 does not extend across the entire air gap 30. As shown in FIG. 2, the air gap 30 defines a "total travel" distance that the armature 20 moves when the solenoid coil is energized and the cylinder 42 defines a sub-portion of the total travel distance, which is shown in FIG. 2 as the "damped travel" distance. Preferably, the "damped travel" distance is from 70 to 50% of the "total travel" distance. The hollow elastomeric cylinder 42 can be formed from any elastomeric material and preferably is formed from a rubber material. Preferably the rubber material of the elastomeric cylinder 42 has hardness properties of from 70 to 90 Durometer Shore A. When the solenoid coil of the valve assembly 10 is energized the armature 20 is rapidly moved across the air gap 30 to the stator 16. The armature 20 contacts the cylinder 42 as it moves across the air gap 30 and the cylinder 42 dampens and slows the movement of the armature 20 across the air gap 30 and also prevents it from slamming against the stator 16 and making the loud clicking noise. Instead, the armature 20 is drawn against the stator 16, but the last 70 to 50% of its travel is damped by the cylinder 42.

Figure 3:
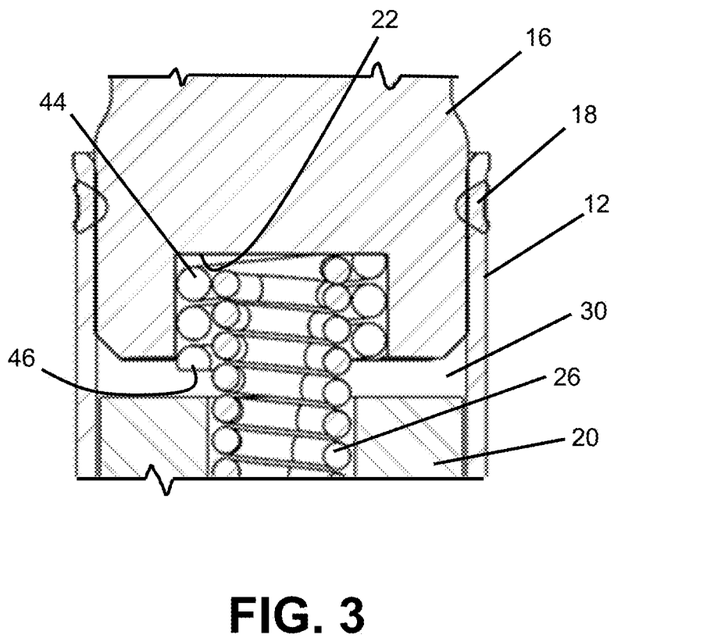
FIG. 3 is a cross-sectional view of a portion of the solenoid poppet valve assembly of FIG. 1 showing a dampening element according to another embodiment of the present invention.

FIG. 3 is a cross-sectional view of a portion of the valve assembly 10 designed in accordance with the present invention showing a dampening element 28 according to another embodiment of the present invention. The dampening element 28 in FIG. 3 is an outer spring 44 that is located around the armature return spring 26 within the pocket 22 of the stator 16. The outer spring 44 is formed from a stiff material and an end 46 of it extends outside the pocket 22. The outer spring 44 is precision ground to fit in the pocket 22 at a specific height that is sufficient to slow the travel speed of the armature 20 as it nears the stator 16; however, it does not provide the same dampening as the cylinder 42.

Figure 4:
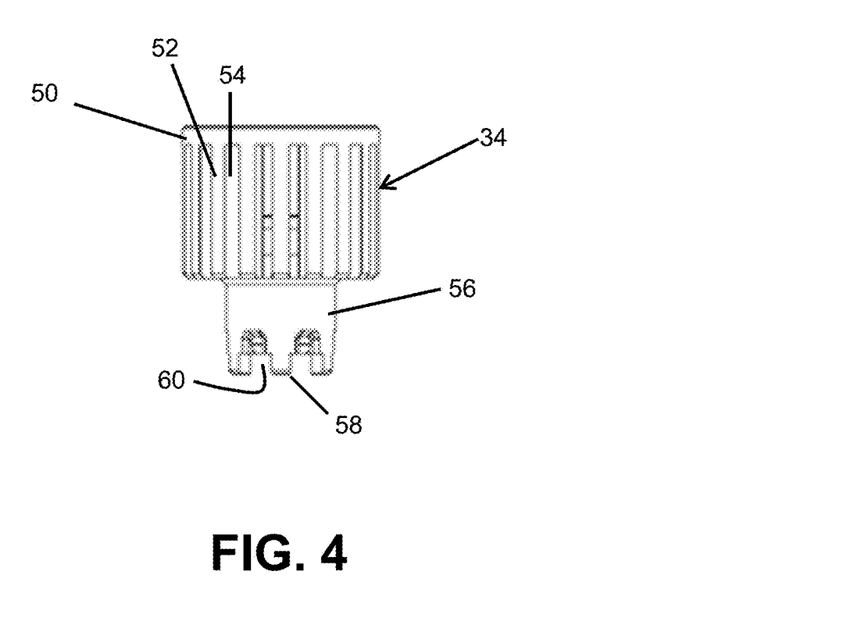
FIG. 4 is a perspective view of a valve seat for the poppet valve assembly of FIG. 1 in accordance with the present invention.
Figure 5:
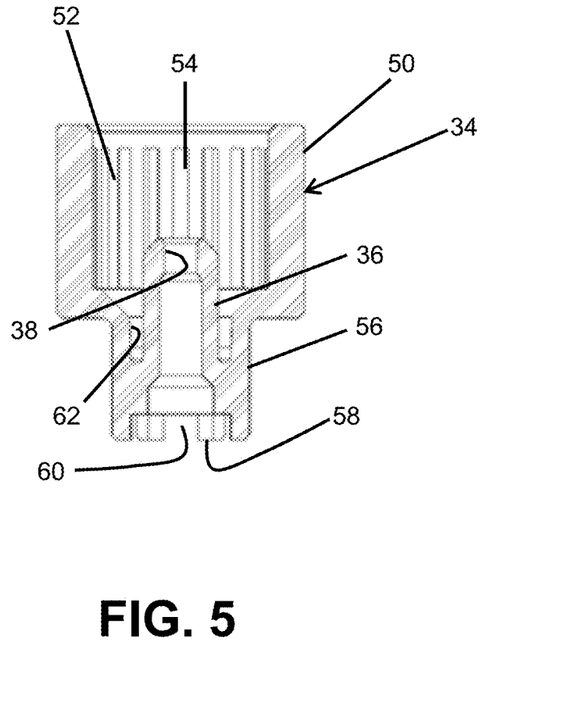
FIG. 5 is a cross-sectional view of the valve seat of FIG. 4 in accordance with the present invention.

FIG. 4 is a perspective view of the valve seat 34 in accordance with the present invention and FIG. 5 is a cross-sectional view of the valve seat 34. The valve seat 34 has an upper portion 50 that includes a plurality of ribs 52 with gaps 54 between each pair of ribs 52. These ribs 52 in the upper portion 50 locate the O-ring upper seal 32 against the flange 14 and retain the upper seal 32 in position for proper sealing against the flange 14 and a modulator bore 82, see FIGS. 7 and 8. The valve seat 34 includes a lower portion 56 which also includes a plurality of ribs 58 with gaps 60 between each pair of ribs 58. The lower portion 56 also includes the integrated valve seat retainer 36. The upper portion 50 and lower portion 56 are joined into a unitary piece in the valve seat 34. As shown in FIG. 1, one end of the housing 12 is inserted through the upper portion 50 and received in an annular groove 62 that surrounds the valve seat retainer 36. Preferably, the housing 12 has an outer diameter that cooperates with the inner diameter of the lower portion 56 to form a tight seal between them and prevents leakage between the housing 12 and the valve seat 34. Preferably, the valve seat 34 is formed from plastic and preferably it is an injection molded part. The gaps 54 and 60 allow for air flow through the valve seat 34 and housing 12. Integration of the valve seat retainer 36 with the valve seat 34 in a unitary design permits for very cost effective manufacturing of the valve seat 34. In addition, it ensures good sealing by the sealing disc 30 and in the modular bore, discussed below. The design of the lower portion 56 also ensures that the valve seat 34 is properly located in a modulator bore 82, see FIG. 7 below.

Figure 6A:
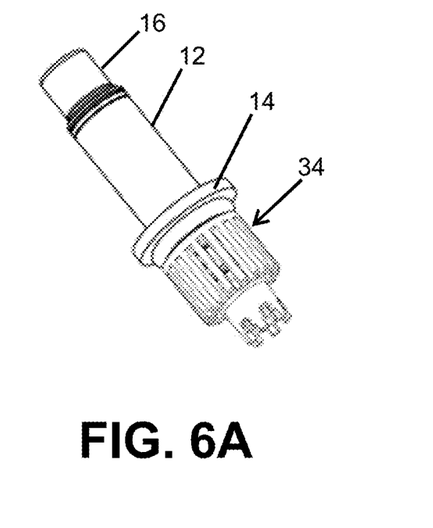
FIG. 6A is a perspective view of the housing and the valve seat according to the present invention without a lower seal.
Figure 6B:
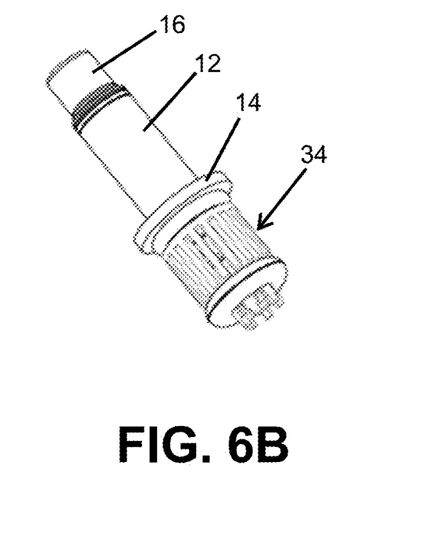
FIG. 6B shows the same view with an O-ring seal.
Figure 6C:
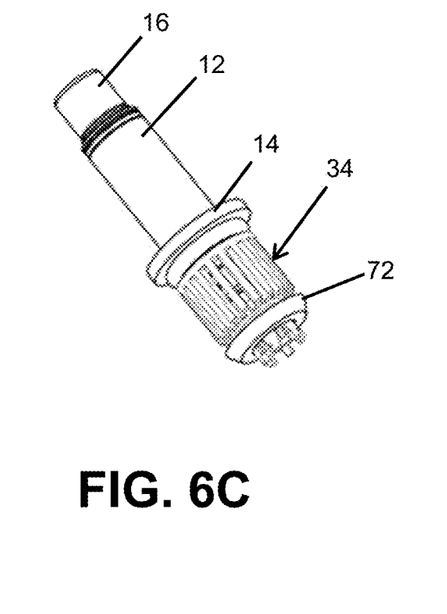
FIG. 6C shows the same view with a lip seal and FIG. 6D is a close up view of a portion of 6C.
Figure 6D:
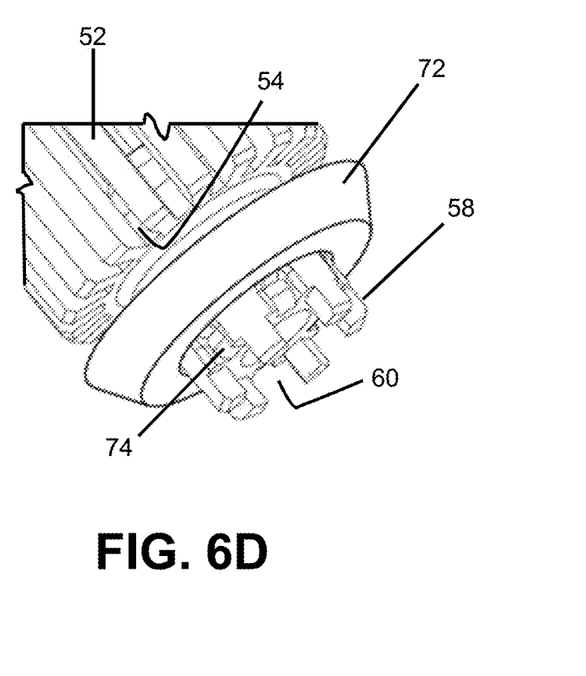

FIG. 6A is a perspective view of the housing 12 and the valve seat 34 according to the present invention without a lower seal 40 in place. FIG. 6B shows the same view with an O-ring 70 as the lower seal 40. FIG. 6C shows the same view with a lip seal 72 as the lower seal 40. Thus, the lower portion 56 retains the lower seal 40 in place. FIG. 6D is a close up view of a portion of FIG. 6C and shows integral flow channels 74 that permit additional air flow in the by-pass design discussed below. The design of the ribs 52 in the valve seat 34 prevents the lower seal 40, whether an O-ring 70 or a lip seal 72, from being extruded from the valve seat 34 at the expected operating pressures of the valve assembly 10.

Figure 7:
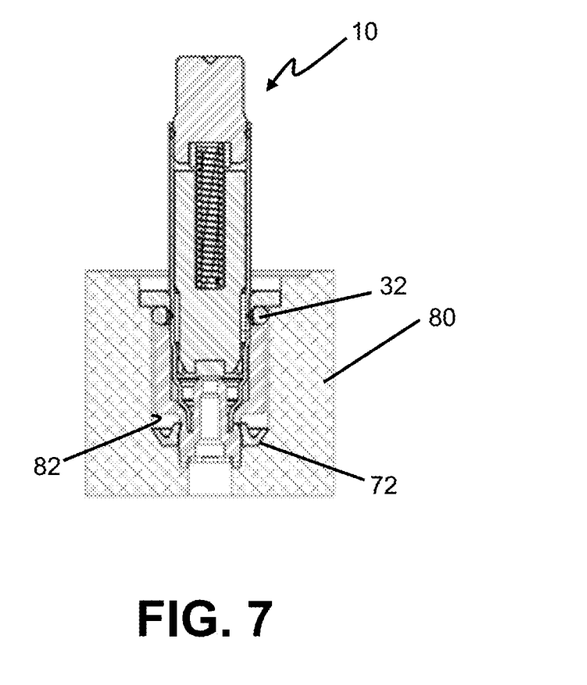
FIG. 7 is a cross-sectional view of a solenoid poppet valve assembly of FIG. 1 having a by-pass feature designed in accordance with the present invention in position in a modulator bore.

FIG. 7 is a cross-sectional view of a solenoid poppet valve assembly 10 designed in accordance with the present invention in position in a modulator housing 80. The modulator housing 80 includes a modulator bore 82 that receives the valve assembly 10 in it. The embodiment shown in FIG. 7 includes the lip seal 72 as the lower seal 40 which permits for a one-way by-pass valve feature in the valve assembly 10 to permit unobstructed flow in one direction through the valve assembly 10. The gaps 60 cooperate with the lip seal 72 to allow for additional air flow through the gaps 60 and into the bore of the housing 12 under the lip seal 72. The gaps 60 are narrow enough and of a geometry as shown in FIG. 6D such that at the intended operating pressures they prevent extrusion of the lip seal 72 from the valve seat 34.

Figure 8:
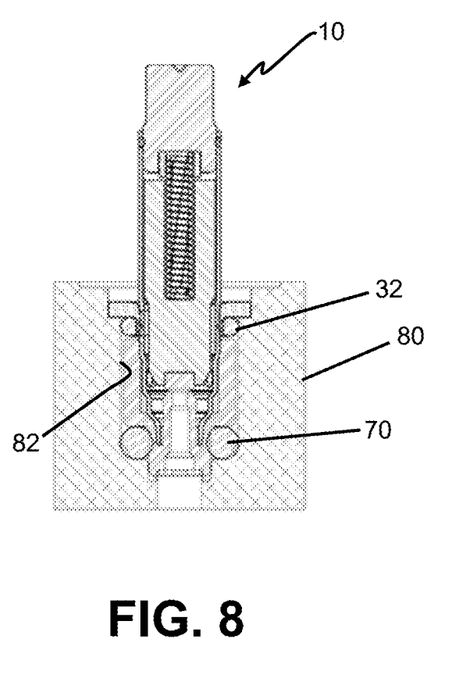
FIG. 8 is a cross-sectional view of a solenoid poppet valve assembly of FIG. 1 with no by-pass feature designed in accordance with the present invention in position in a modulator bore.

FIG. 8 is a cross-sectional view of a solenoid poppet valve assembly 10 designed in accordance with the present invention in position in the modulator housing 80. The modulator housing 80 includes the modulator bore 82 that receives the valve assembly 10 in it. The embodiment shown in FIG. 8 includes the O-ring 70 as the lower seal 40 which does not permit for a by-pass valve feature in the valve assembly 10 as is shown in FIG. 7. Thus, the simplified design of the present valve seat 34 permits one to allow or not allow for a by-pass valve feature utilizing the exact same valve assembly 10 and valve seat 34 design with the only change being use of a lip seal 72 or an O-ring 70 as the lower seal 40. This reduces cost and greatly increases the utility of the valve assembly 10 in a variety of environments. There is no need to change the design of the valve assembly 10, valve seat 34, modulator housing 80 or modulator bore 82 to accommodate a by-pass valve feature design if desired.

Figure 9:
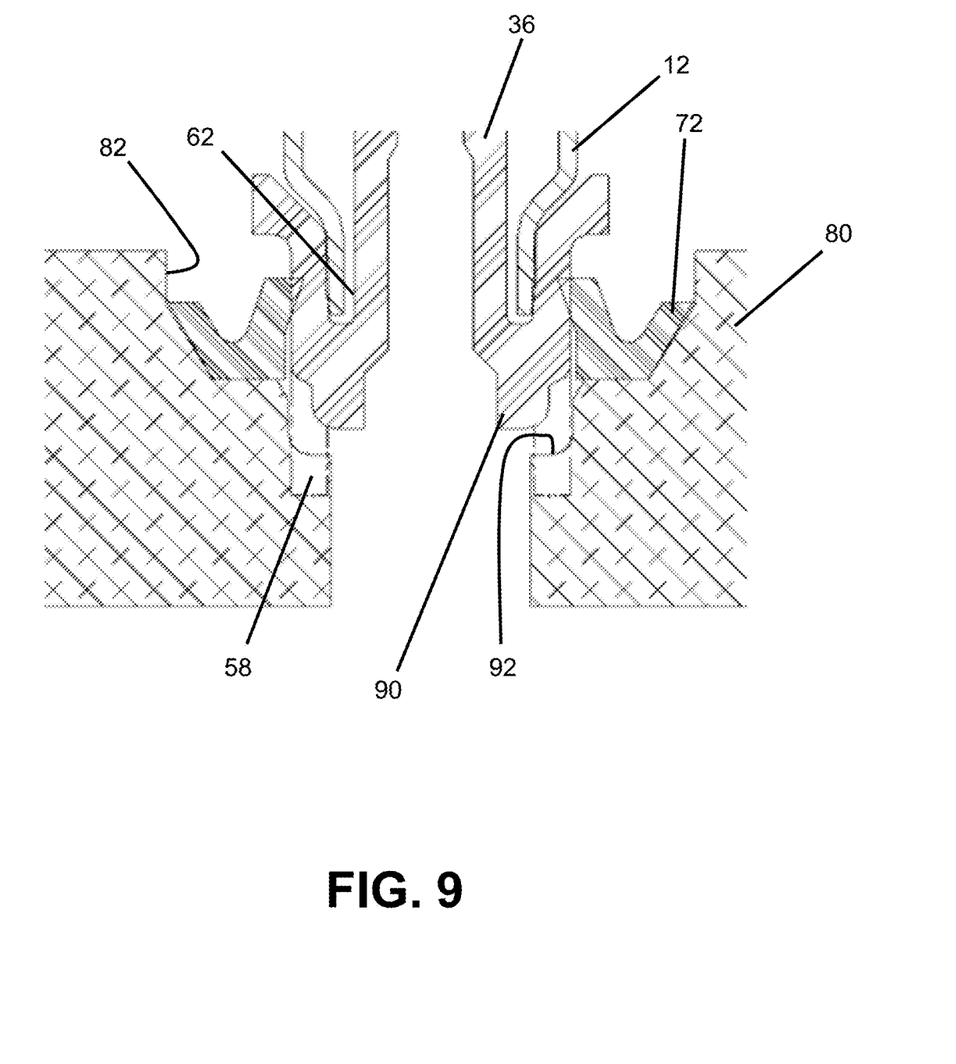
FIG. 9 shows a cross-sectional view of a portion of the solenoid poppet valve assembly of FIG. 1 that includes a series of retention features in the valve seat.

FIG. 9 shows a cross-sectional view of a portion of a solenoid poppet valve assembly 10 in accordance with the present invention that includes retention features. The valve assembly 10 is shown as nearly fully seated in the modulator housing 80 in the modulator bore 82. The valve seat 34, in this design, includes a plurality of crushable ribs 90 each of which reacts against a step 92 in the modulator bore 82 as the valve seat 34 is seated in the modulator bore 82. The steps 92 crush the ribs 90 inward when the valve seat 34 is fully seated. This creates a positive force that pushes the valve seat retainer 36 up against the bottom of the housing 12 and ensures that they are in positive contact with each other. The design of the ribs 90 can be altered to ensure the proper amount of crushability and retentive force exerted.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A pneumatic solenoid poppet valve assembly comprising:
    a housing having a first end and a second end;
    a stator secured in and to said first end of said housing and including a spring pocket;
    said second end of said housing retained in a valve seat;
    an armature located fully inside said housing and between said stator and said second end and slidable in said housing, said armature including a spring pocket;
    an armature return spring located in said spring pocket of said stator and in said spring pocket of said armature, said return spring biasing said armature away from said stator and creating an air gap between said stator and said armature;
    a dampening element located in said spring pocket in said stator, said dampening element surrounding said return spring in said spring pocket in said stator and extending out of said spring pocket in said stator into said air gap, wherein when a solenoid is energized said armature is moved across said air gap and contacts said dampening element prior to contacting said stator and said dampening element dampens movement of said stator across said air gap; and
    wherein said valve seat comprises an upper portion and a lower portion, said upper portion including a plurality of ribs with each rib separated from an adjacent rib by a gap, said gaps permitting air flow through said upper portion, wherein said lower portion includes a plurality of ribs with each rib separated from an adjacent rib by a gap, said gaps permitting air flow through said lower portion.

2. The pneumatic solenoid poppet valve assembly as recited in claim 1, wherein said dampening element is an outer spring, said outer spring surrounding said return spring in said spring pocket in said stator and extending out of said spring pocket in said stator and into said air gap.

3. The pneumatic solenoid poppet valve assembly as recited in claim 1, wherein said lower portion has an inside diameter and said second end of said housing has an outer diameter such that when said second end of said housing is received in said lower portion, a seal is formed between said housing and said valve seat, and leakage between said housing and said valve seat is not permitted.

4. The pneumatic solenoid poppet valve assembly as recited in claim 1, wherein said lower portion further includes a lower seal that is one of an O-ring seal or a lip seal having a one-way by-pass valve feature.

5. The pneumatic solenoid poppet valve assembly as recited in claim 1, wherein said dampening element is an elastomeric, hollow, cylinder.

6. The pneumatic solenoid poppet valve assembly as recited in claim 5, wherein said cylinder extends out of said spring pocket and into said air gap for a distance of from 50 to 70% of the width of said air gap.

7. The pneumatic solenoid poppet valve assembly as recited in claim 5, wherein said cylinder is formed from a rubber material having hardness properties of from 70 to 90 Durometer Shore A.

8. A pneumatic solenoid poppet valve assembly comprising:
    a housing having a first end and a second end;
    a stator secured in and to said first end of said housing and including a spring pocket;
    said second end of said housing retained in a valve seat;
    an armature located fully inside said housing and between said stator and said second end and slidable in said housing, said armature including a spring pocket;
    an armature return spring located in said spring pocket of said stator and in said spring pocket of said armature, said return spring biasing said armature away from said stator and creating an air gap between said stator and said armature;
    said valve seat comprising an upper portion and a lower portion, said upper portion including a plurality of ribs with each rib separated from an adjacent rib by a gap, said gaps permitting air flow through said upper portion; and
    wherein said lower portion includes a plurality of ribs with each rib separated from an adjacent rib by a gap, said gaps permitting air flow through said lower portion.

9. The pneumatic solenoid poppet valve assembly as recited in claim 8, wherein said valve seat is formed from an injection molded plastic.

10. The pneumatic solenoid poppet valve assembly as recited in claim 8 wherein said upper portion and said lower portion are a unitary piece.

11. The pneumatic solenoid poppet valve assembly as recited in claim 8, wherein said lower portion includes a lower seal that is one of an O-ring seal or a lip seal having a one way by-pass valve feature.

12. The pneumatic solenoid poppet valve assembly as recited in claim 8, wherein said lower portion locates and retains a lower seal.

\* \* \* \* \*